United States Patent
ElHilali et al.

(10) Patent No.: US 9,489,837 B1
(45) Date of Patent: Nov. 8, 2016

(54) PROVIDING STORAGE SYSTEM TELEMETRY DATA

(71) Applicant: EMC IP Holding Company, LLC, Hopkinton, MA (US)

(72) Inventors: Oussama ElHilali, Dover, MA (US); Marik Marshak, Newton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 174 days.

(21) Appl. No.: 14/314,378

(22) Filed: Jun. 25, 2014

(51) Int. Cl.
*G08C 19/00* (2006.01)

(52) U.S. Cl.
CPC .................................... *G08C 19/00* (2013.01)

(58) Field of Classification Search
CPC . H04L 69/04; H04N 19/00; G06F 17/30153; G06F 17/30156; G08C 19/00
See application file for complete search history.

(56) References Cited

U.S. PATENT DOCUMENTS

| 2013/0275396 A1* | 10/2013 | Condict | H03M 7/607 707/693 |
| 2015/0006475 A1* | 1/2015 | Guo | G06F 17/30159 707/609 |

\* cited by examiner

*Primary Examiner* — Curtis Odom
(74) *Attorney, Agent, or Firm* — Muirhead and Saturnelli, LLC (57) ABSTRACT

Reducing telemetry data transmitted from a storage system includes selecting a data reduction algorithm from a plurality of data reduction algorithms, where selection includes eliminating data reduction algorithms that process frames of telemetry data at a lower rate than the frames of telemetry data are generated and applying the data reduction algorithm to the telemetry data. Selecting a data reduction algorithm may include selecting a remaining one of the data reduction algorithms that provides a greatest amount of data reduction. Reducing telemetry data transmitted from a storage system may also include determining if the data reduction algorithm sufficiently reduces an amount of data that is transmitted using a communications channel and removing some of the telemetry data in response to the data reduction algorithm not sufficiently reducing the amount of data that is transmitted. The data reduction algorithms may include data de-duplication and data compression.

14 Claims, 7 Drawing Sheets

PROVIDING STORAGE SYSTEM TELEMETRY DATA

TECHNICAL FIELD

This application relates to computer storage arrays, and more particularly to the field of transmitting telemetry data for computer storage arrays.

BACKGROUND OF THE INVENTION

Host processor systems may store and retrieve data using a storage array containing a plurality of host interface units (host adapters), disk drives, and disk interface units (disk adapters). Such storage arrays are provided, for example, by EMC Corporation of Hopkinton, Mass. The host systems access the storage array through a plurality of channels provided therewith. Host systems provide data and access control information through the channels of the storage array and the storage array provides data to the host systems also through the channels. The host systems do not address the disk drives of the storage array directly, but rather, access what appears to the host systems as a plurality of logical volumes. The logical volumes may or may not correspond to the actual disk drives.

It is possible to collect telemetry data (performance metrics) and other system events from the storage array(s). The telemetry data can be useful both to the customers as well to the provider of the storage array(s). Also, telemetry data from different sites can be useful to engineering teams for research as well for developing offline models and predictions to improve storage array operations.

Existing management tools that are directly connected to the storage array(s) allow the customer have access to the telemetry data. However the storage array telemetry data may not be available or may be only partially available to systems that are not part of the storage array(s). In many instances, storage arrays have limited bandwidth for sending telemetry data, which restricts significantly the amount of telemetry data that can be sent from the storage array(s) in a reasonable amount of time to make the telemetry data useful. In addition, even in instances where the storage array communication bandwidth itself is not an issue, a customer may not want to use a significant amount of site bandwidth for transmitting storage array telemetry data.

One solution is to transmit only a small subset of the telemetry data from the storage array(s). The downside of this approach is that, because the telemetry data set is relatively small, the ability to extract useful information from the telemetry data is limited. Also, in instances where more telemetry data is sent over an extended period of time, the delay that is introduced may further reduce the usefulness of the telemetry data.

Accordingly, it is desirable to provide a mechanism to send telemetry data in a timely fashion using a bandwidth limited communication connection.

SUMMARY OF THE INVENTION

According to the system described herein, reducing telemetry data transmitted from a storage system includes selecting a data reduction algorithm from a plurality of data reduction algorithms, where selection includes eliminating data reduction algorithms that process frames of telemetry data at a lower rate than the frames of telemetry data are generated and applying the data reduction algorithm to the telemetry data. Selecting a data reduction algorithm may include selecting a remaining one of the data reduction algorithms that provides a greatest amount of data reduction. Reducing telemetry data transmitted from a storage system may also include determining if the data reduction algorithm sufficiently reduces an amount of data that is transmitted using a communications channel and removing some of the telemetry data in response to the data reduction algorithm not sufficiently reducing the amount of data that is transmitted. The data reduction algorithms may include data de-duplication and data compression. Selecting a data reduction algorithm may include matching current telemetry data with historical telemetry data. A particular table of data reduction algorithms may be selected based on the historical telemetry data. The table may include a plurality of entries, each corresponding to a specific data reduction algorithm. Each of the entries may include values for a first field indicating an amount of time it takes to run a corresponding data reduction algorithm and an amount of data reduction provided by the corresponding data reduction algorithm.

According further to the system described herein, computer software, provided in a non-transitory computer-readable medium, reduces telemetry data transmitted from a storage system. The software includes executable code that selects a data reduction algorithm from a plurality of data reduction algorithms, where selection includes eliminating data reduction algorithms that process frames of telemetry data at a lower rate than the frames of telemetry data are generated and executable code that applies the data reduction algorithm to the telemetry data. Executable code that selects a data reduction algorithm may select a remaining one of the data reduction algorithms that provides a greatest amount of data reduction. The software may also include executable code that determines if the data reduction algorithm sufficiently reduces an amount of data that is transmitted using a communications channel and executable code that removes some of the telemetry data in response to the data reduction algorithm not sufficiently reducing the amount of data that is transmitted. The data reduction algorithms may include data de-duplication and data compression. Executable code that selects a data reduction algorithm may match current telemetry data with historical telemetry data. A particular table of data reduction algorithms may be selected based on the historical telemetry data. The table may include a plurality of entries, each corresponding to a specific data reduction algorithm. Each of the entries may include values for a first field indicating an amount of time it takes to run a corresponding data reduction algorithm and an amount of data reduction provided by the corresponding data reduction algorithm.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
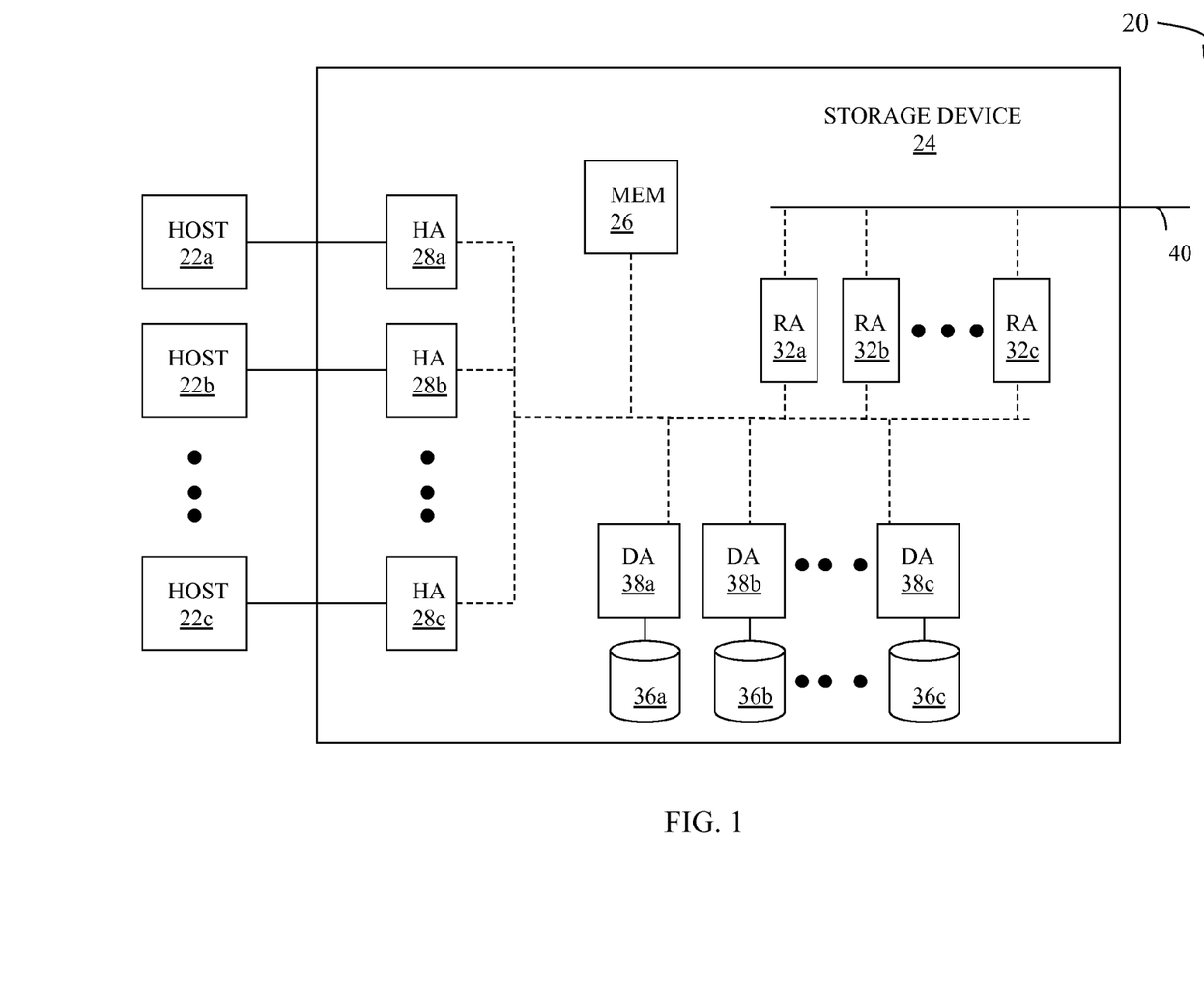
FIG. 1 is a schematic diagram showing a plurality of hosts coupled to a data storage array that may be used in connection with an embodiment of the system described herein.

Referring to FIG. 1, a diagram 20 shows a plurality of hosts 22a-22c coupled to a data storage array 24 that may be used in connection with an embodiment of the system described herein. The data storage array 24 includes a memory 26 that facilitates operation of the storage array 24, as further described elsewhere herein. The data storage array 24 also includes a plurality of host adapters (HA's) 28a-28c that handle reading and writing of data between the hosts 22a-22c and the storage array 24. Although the diagram 20 shows each of the hosts 22a-22c coupled to each of the HA's 28a-28c, it will be appreciated by one of ordinary skill in the art that one or more of the HA's 28a-28c may be coupled to other hosts. In various embodiments, the storage array 24 may be a Symmetrix storage device, a CLARiiON storage device and/or a VPLEX product produced by EMC Corporation of Hopkinton, Mass., although the system described herein may also operate in connection with any other suitable storage devices and products.

In an embodiment, the storage array 24 may include one or more Remote Data Facility (RDF) adapter units (RA's) 32a-32c. An RDF product produced by EMC Corporation, may be used to copy data from one storage array to another. For example, if a host writes data to a first storage array (e.g., a local storage array), it may be desirable to copy that data to a second storage array provided in a different location (e.g., a remote storage array). The RA's 32a-32c are coupled to an RDF link 40 and are similar to the HA's 28a-28c, but are used to transfer data between the storage array 24 and other storage arrays that are also coupled to the RDF link 40. The storage array 24 may be coupled to additional RDF links (not shown) in addition to the RDF link 40. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The storage array 24 may also include one or more disks 36a-36c, each containing a different portion of data stored on the storage array 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage array 24 that corresponds to the disks 36a-36c may be subdivided into a plurality of volumes or logical devices. The logical storage space may also be merged in connection with use of a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage array 24 may be provided as a stand-alone device coupled to the hosts 22a-22c as shown in FIG. 1 or, alternatively, the storage array 24 may be part of, and/or otherwise coupled to, a storage area network (SAN) that may include a plurality of other storage arrays as well as switches, routers, network connections, etc., as further discussed elsewhere herein.

Figure 2:
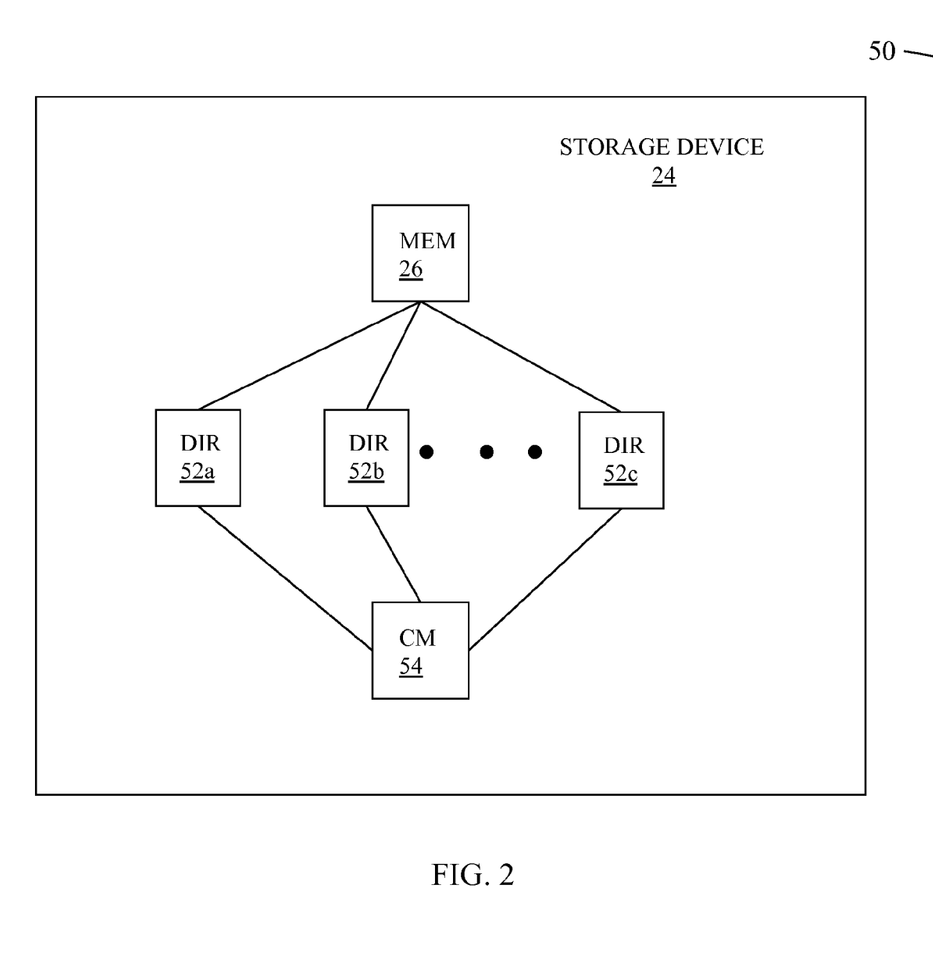
FIG. 2 is a schematic diagram illustrating a plurality of directors coupled to a memory according to an embodiment of the system described herein.

FIG. 2 is a schematic diagram 50 illustrating an embodiment of the storage array 24 where each of a plurality of directors 52a-52c are coupled to the memory 26. Each of the directors 52a-52c may represent one of the HA's 28a-28c, RA's 32a-32c, and/or DA's 38a-38c. In an embodiment herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage array and accessible by each of the storage arrays.

Note that, although specific storage array configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage arrays in a manner that allows reconfiguring connections without having to physically disconnect and reconnect cables from and to ports of the components of the SAN. A SAN may be implemented using one or more switches to which the storage arrays and host devices are coupled. The switches may be programmed to allow connections between specific ports of components coupled to the switches. A port that can initiate a data-path connection may be called an "initiator" port while the other port may be deemed a "target" port.

Figure 3:
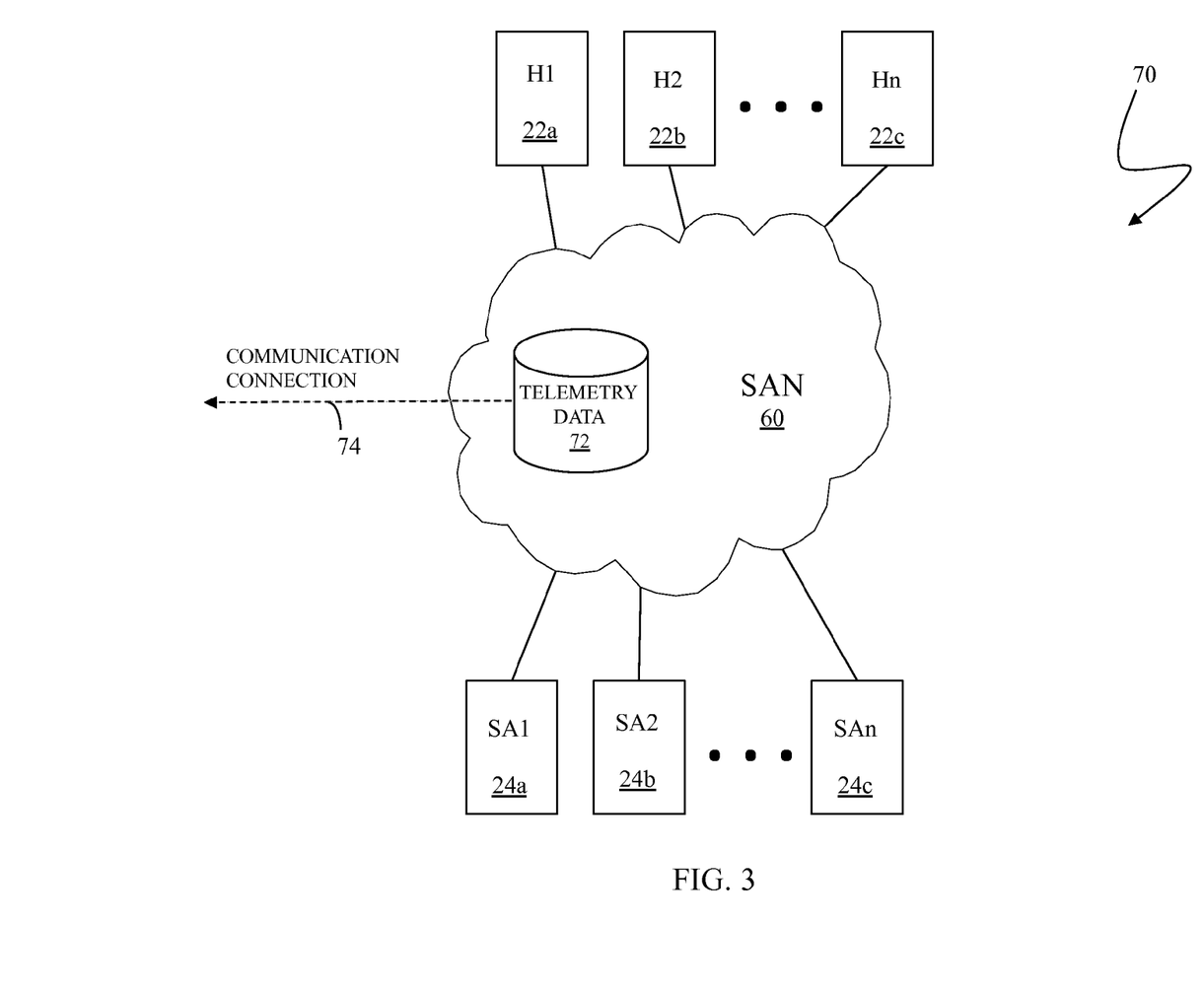
FIG. 3 is a schematic illustration showing a storage area network (SAN) providing a SAN fabric coupling between a plurality of host devices and a plurality of storage arrays that may be used in connection with an embodiment of the system described herein.

FIG. 3 is a schematic illustration 70 showing a storage area network (SAN) 60 providing a SAN fabric coupling a plurality of host components (H1-Hn) 22a-c to a plurality of storage array components (SA1-SAn) 24a-c that may be used in connection with an embodiment of the system described herein. Each of the components 22a-c, 24a-c may have a corresponding port that is physically coupled to switches (not shown) of the SAN fabric used to implement the storage area network 60. The switches may be separately programmed by one of the components 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage array 24a. Upon becoming activated (e.g., powering up), the host 22a and the storage array 24a may send appropriate signals to the switch(es) of the storage area network 60, and each other, which then allows the host 22a to initiate a data-path connection between the port of the host 22a and the port of the storage array 24a. Zones may be defined in terms of a unique identifier associated with each of the ports, such as such as a world-wide port name (WWPN).

There is performance and operational data associated with each of the storage arrays 24a-24c of the SAN 60 and/or with the SAN 60 itself which may be provided as telemetry data 72. The telemetry data 72 may include performance metrics such as a distribution of read/write latency times, concentration and distribution of data on disks of the storage arrays 24a-24c, activity level as a function of time, etc. Generally, the telemetry data can include any data related to the storage arrays 24a-24c that is determined by the manufacturer and/or by the customer to be useful for collecting. In some instances, the telemetry data may be used to improve operation of the SAN 60, including adjusting the deployment configuration of the storage arrays 24a-24c and/or determining when a customer needs more storage. The telemetry data may also be used by storage system designers to improve performance of storage systems.

A communication connection 74 provides for transmission of the telemetry data 72 to a destination, such as cloud storage or back to a manufacturer of the storage system. The communication connection 74 may include a conventional hardwired Internet connection (e.g., a router), a WiFi or cellular connection to the Internet, a connection to a network or destination that is not part of the Internet, or any other type of data communication mechanism. In some instances, the amount of the telemetry data 72 that is produced exceeds the bandwidth of the communication connection 74 and/or the bandwidth the customer provides for use of the communication connection 74. In such a case, it may be necessary to provide a mechanism for transmitting the telemetry data 72 over the communication connection in spite of any bandwidth limitations.

Figure 4:
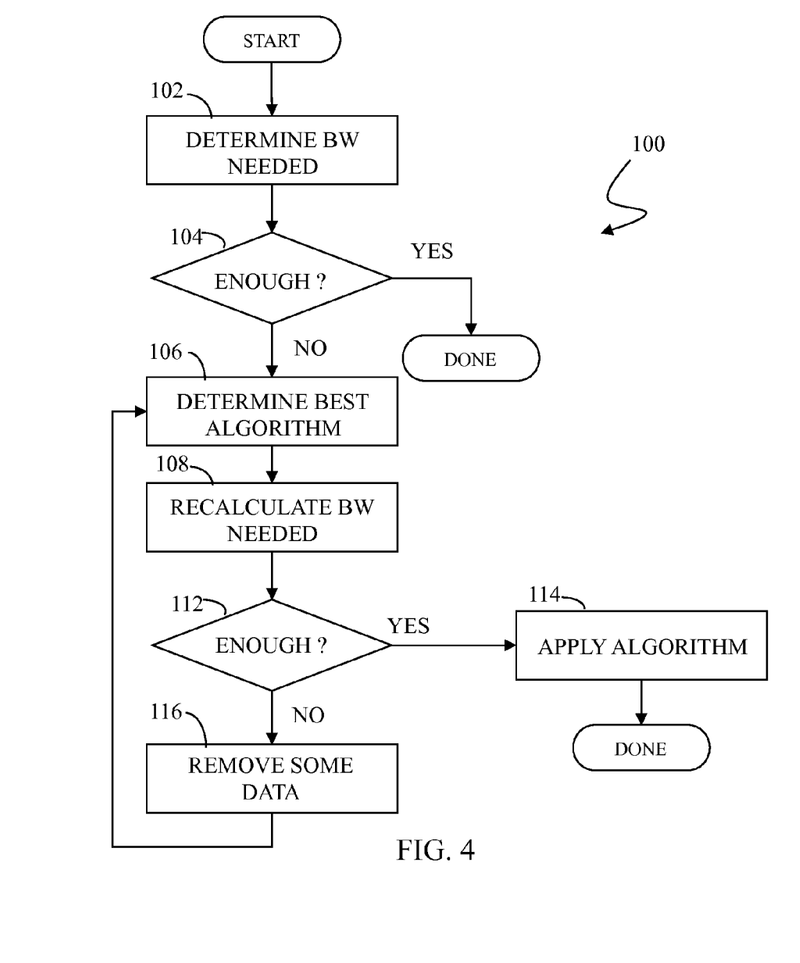
FIG. 4 is a flow diagram illustrating preparing telemetry data for transmission according to an embodiment of the system described herein.

Referring to FIG. 4, a flow diagram 100 illustrates steps performed in connection with transmission of telemetry data using the possibly bandwidth limited communication connection 74. Processing begins at a first step 102 where the bandwidth needed to transmit the telemetry data is determined. Determining the bandwidth at the step 102 includes determining the amount of telemetry data generated per unit time. For example, if one MB of telemetry data is generated every second, then the amount of bandwidth needed is one MB per second (and perhaps more to account for overhead, etc.). Following the step 102 is a test step 104 where it is determined if the communication connections 74 has enough bandwidth capability to handle the amount of bandwidth needed (determined at the step 102). If so, that processing is complete since no data reduction is required. For example, if one MB per second is needed to transmit telemetry data, and two MB per second is available, then no data reduction is necessary.

If it is determined at the test step 104 that the bandwidth provided in connection with the communication connection 74 is not enough to transmit generated telemetry data, then control transfers from the test step 104 to a step 106 where a best data reduction algorithm is determined. Determining the best data reduction algorithm at the step 106 is described in more detail elsewhere herein. Note that the term "data reduction" as used herein refers to reducing an amount of data that is transmitted using the communication connection 74 without eliminating significant information. Examples of data reduction algorithms include data de-duplication and data compression.

Following step 106 is a step 108 where the amount of bandwidth needed to transmit the telemetry data is recalculated. Recalculation at the step 108 is provided because the amount of needed bandwidth should be less than the amount determined at step 102 after selecting a data reduction algorithm at the step 106. In some instances, it may be possible that no data reduction algorithm is selected at the step 106 (because none of the data reduction algorithms could run in less than the required amount of time), in which case the needed bandwidth determined at the step 108 is the same as the needed bandwidth determined at the step 102.

Following the step 108 is a test step 112 where it is determined if the communication connection 74 has enough bandwidth to transmit the telemetry data based on the needed bandwidth calculated at the step 108. If so, then control transfers from the test step 112 to a step 114 where the algorithm determined at the step 106 is applied to the telemetry data. Applying the algorithm to the telemetry data at the step 114 is discussed in more detail elsewhere herein. Following step 114, processing is complete.

If it is determined at the test at 112 that the communication connection 74 does not provide enough bandwidth to transmit the telemetry data (even after applying data reduction), then control transfers from the test step 112 to a step 116 where some of the telemetry data is removed. That is, if the best data reduction algorithm selected at the step 106 does not reduce the amount of data to be transmitted enough based on the transmission capacity associated with the communication connection 74, then some of the telemetry data cannot be transmitted and is removed at the step 116. The specific data that is removed maybe user selectable or maybe selected based on an automated algorithm that determines which data is to be removed based on pre-programmed parameters. Following this step 116, control transfers back to the step 106 for another iteration. Note that it is possible for additional data to be removed in a second and subsequent iteration. In some embodiments, there may be a test step (not shown in FIG. 4) that provides an error message if too much of the telemetry data is removed.

Note that there is a tradeoff associated with providing the processing illustrated in FIG. 4. On the one hand, providing the processing more frequently (i.e., more frequently determining an appropriate data reduction technique) increases the likelihood of using the most optimal technique at any one time. However, there may be significant overhead associated with providing the processing illustrated in FIG. 4, thus making it beneficial to perform the processing less frequently. The frequency selected for running the processing of FIG. 4 is based on the tradeoff between optimizing the data reduction mechanism that is used without introducing significant overhead in connection with the selection process.

Figure 5:
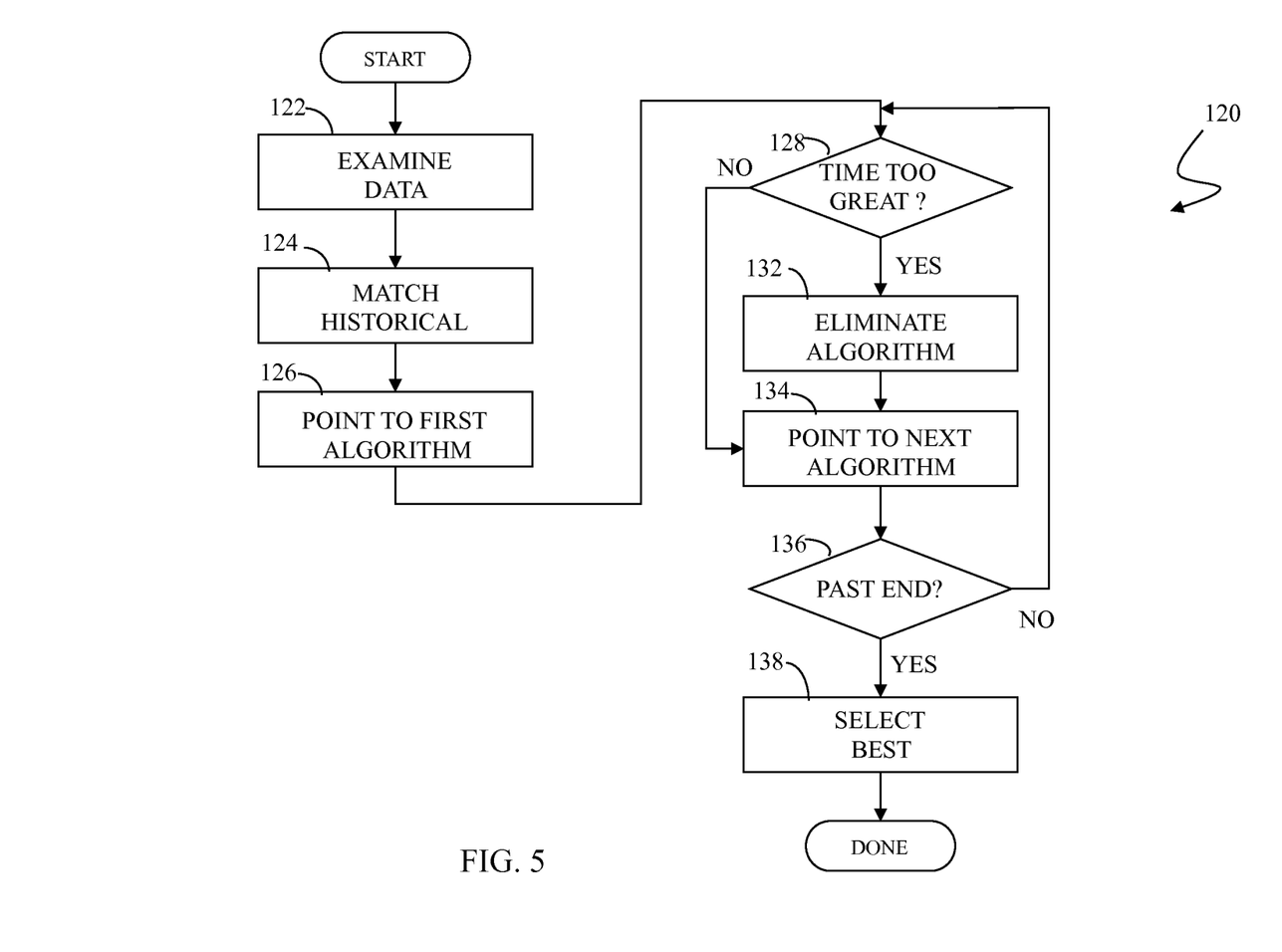
FIG. 5 is flow diagram illustrating selecting an algorithm for transmitting telemetry data according to an embodiment of the system described herein.

Referring to FIG. 5, a flow diagram 120 illustrates in more detail processing provided at the step 106, discussed above, where a best data reduction algorithm is determined. Processing begins at a first step 122 where the telemetry data is examined to ascertain characteristics that allow matching of the current telemetry data with historical telemetry data in order to facilitate selection of a data reduction algorithm. Following step 122 is a step 124 where the current telemetry data is matched with historical telemetry data by, for example, using conventional techniques to select the best match. As discussed in more detail below, the historical telemetry data may have been previously analyzed with respect to different data reduction techniques and the effectiveness thereof. Thus, matching the historical telemetry data with the current telemetry data provides a mechanism for predicting the effectiveness of different data reduction techniques.

Following the step 124 is a step 126 where an iteration pointer is set to point to the first of a plurality of data reduction algorithms. The iteration pointer is used to generate through the data reduction algorithms. Following step 126 is a test step 128 where it is determined if the amount of time it would take to run the particular data reduction algorithm indicated by the interaction pointer would be greater than an amount of time available to run the algorithm (i.e., the data reduction algorithm processes frames at a rate that is lower than the rate at which the telemetry data frames are generated). For example, if the system generates one telemetry frame per second and it takes two seconds per frame to run a particular data reduction algorithm, then the particular data reduction algorithm takes too much time. If it is determined at the test step 128 that the data reduction algorithm takes too much time, then control transfers from the test at 128 to the step 132 where the algorithm indicated by the iteration pointer is eliminated from the list of possible algorithms. If a data reduction algorithm takes too much time to run, and then the data reduction algorithm cannot be used.

Following step 132 is a step 134 where the iteration pointer is set to point to the next data reduction algorithm. Note that the step 134 may also be reached from the step 128 if it is determined that the data reduction algorithm does not take too much time. Following the step 134 is a test step 136 where it is determined if the iteration pointer points past the end of the list (i.e., all of the data reduction algorithms have been examined). If not, and control transfers back to the step 128 to examine the next data reduction algorithm. Otherwise, control transfers from the test step 136 to a step 138 where the best the reduction algorithm out of the remaining data reduction algorithms is selected. In an embodiment herein, the best data reduction algorithm is the data reduction algorithm that provides the greatest reduction in the amount of data that needs to be transmitted. Following the step 138, processing is complete.

Figure 6:
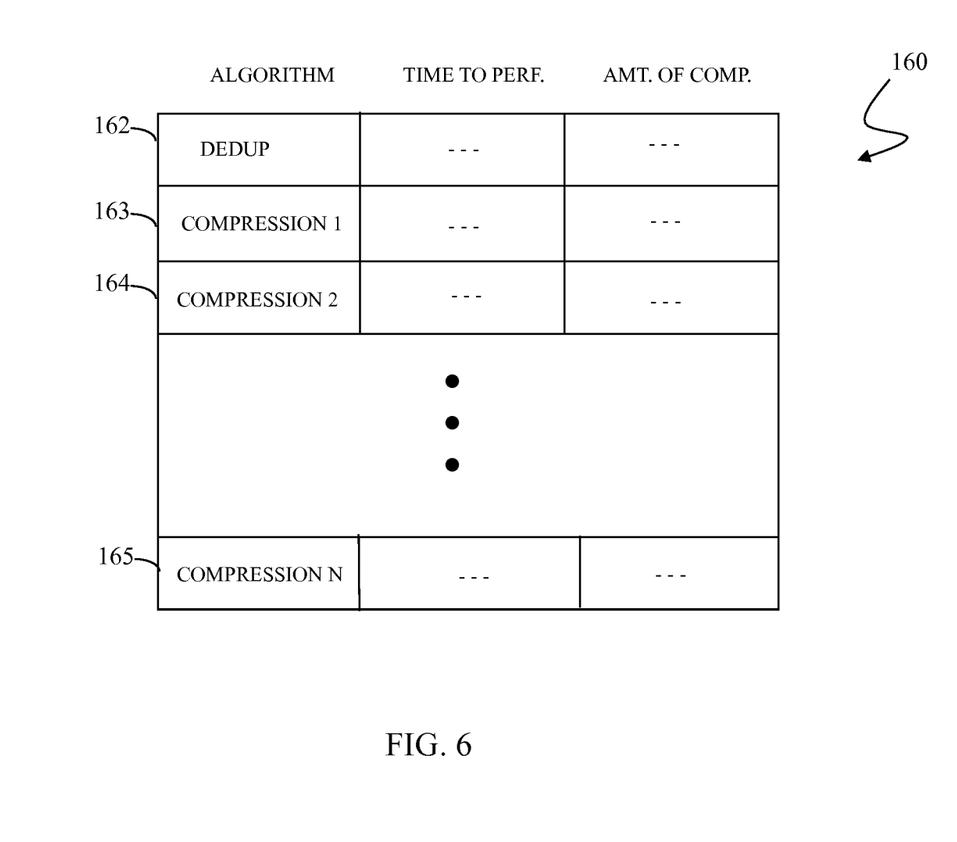
FIG. 6 is a schematic illustration of a table used in connection with selecting a data reduction algorithm for transmitting telemetry data according to an embodiment of the system described herein.

Referring to FIG. 6, a table 160 illustrates various values and parameters used to provide the processing for determining which of the data reduction algorithms to choose. The table 160 includes a plurality of entries 162-165, each of which corresponds to a different data reduction algorithm. The entry 162 corresponds to data de-duplication, which is a special type of data reduction algorithm that involves replacing duplicate entries of data with a marker indicating to the receiver that particular data should be reconstructed by duplicating other data that has already been transmitted. The entries 163-165 represent various conventional data compression techniques, such as the Gzip (GZ), and Lempel-Ziv-Oberhumer (LZO) techniques. Of course, other data compression techniques could be used and even other mechanisms for reducing transmitted data may also be used. For example, in an incremental or differential incremental technique, only values that have changes are sent. At the receiving side, the modified data is superimposed on a previous version of the data to create a synthetic copy with updated changes.

Note that some of the entries 163-165 may correspond to combinations of other ones of the entries 163-165 since, in many cases, compression techniques may be combined. That is, one of the entries 163-165 may correspond to compression technique A, another one of the entries 163-165 may correspond to compression technique B, and another one of the entries 163-165 may correspond to the combination of compression techniques A and B. Note that, in many instances, de-duplication is not combinable with other compression techniques.

Each of the entries 162-165 includes a field that identifies the particular data reduction technique, a field indicating the time it takes to perform the technique, and a field indicating the amount of data reduction provided by the technique. The fields are used by the processing that selects which of the data reduction algorithms to use, described elsewhere herein. The values for these fields are provided by off-line analysis of historical telemetry data. There may be a separate table (different values in the fields) for each possible type (classification) of historical telemetry data. Provided that it is possible to obtain a reasonable match of current telemetry data with historical telemetry data, the values of fields in the table 160 should be a reasonable approximation for processing time and amount of reduction for the current telemetry data.

Figure 7:
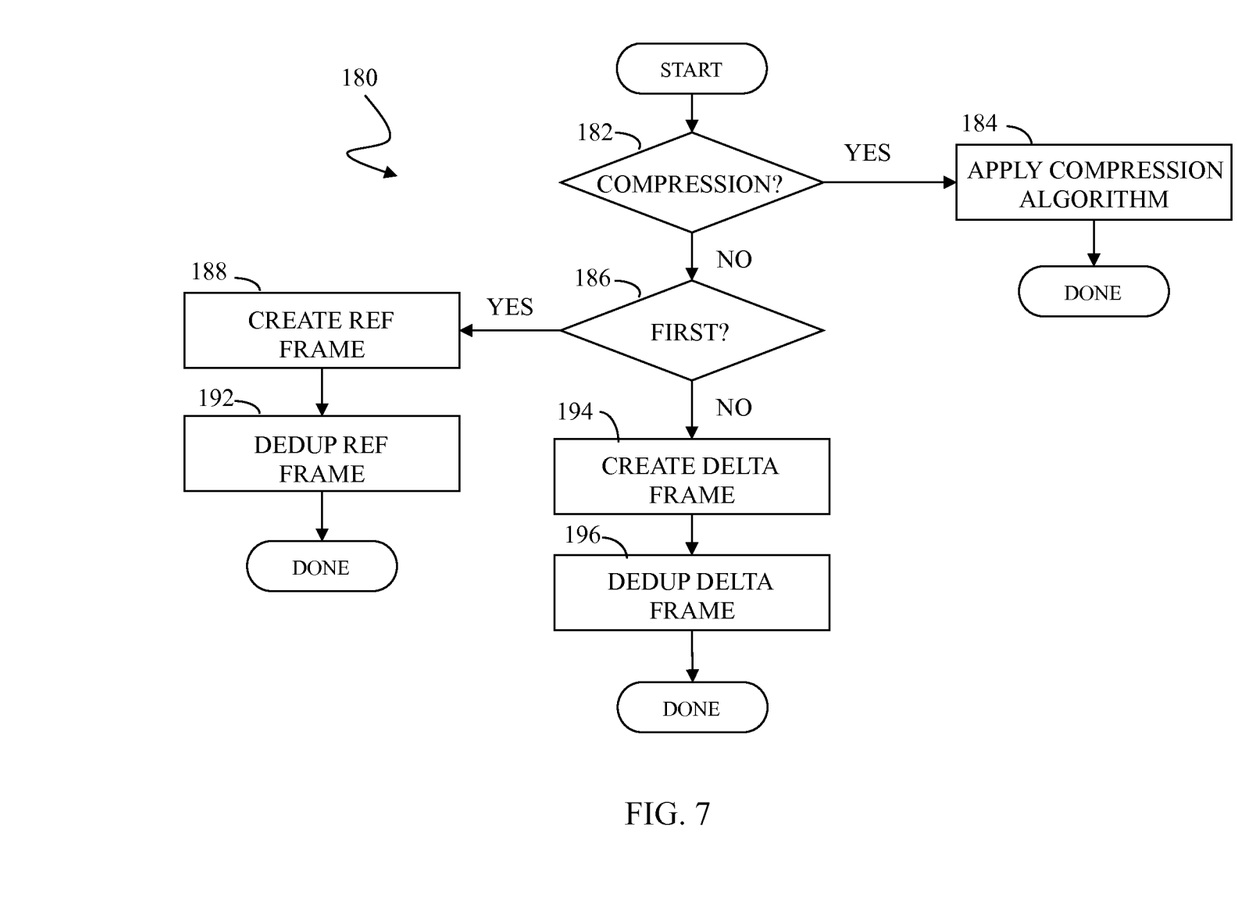
FIG. 7 is a flow diagram illustrating applying a data reduction algorithm to telemetry data according to an embodiment of the system described herein.

Referring to FIG. 7, a flow diagram 180 illustrates in more detail processing performed at the step 114 of the flow diagram 100 where the chosen algorithm is applied to the data. Processing begins at a first test step 182 where it is determined if the algorithm that is chosen is a compression algorithm (not de-duplication). If so, then control transfers from the test step 182 to a step 184 where the compression algorithm is applied to the data. Following step 184, processing is complete.

If it is determined at the test step 184 that the chosen algorithm is not a compression algorithm (is de-duplication), then control transfers from the test step 182 to a test step 186 where it is determined if a particular frame being processed is a first frame of the telemetry data. If so, and control transfers from the test step 186 to a step 188 where a reference frame (used for subsequent de-duplication of future frames of telemetry data) is created. Following step 188 is a step 192 where the reference frame is de-duplicated (i.e., duplicate data is removed from the reference frame itself). Following step 192, processing is complete.

If it is determined at the test step 186 that the telemetry data frame being processed is not the first frame, then control transfers from the test step 186 to a step 194 where a delta frame is created. The delta frame represents a difference between the current frame and the reference frame. Following the step 194 is a step 196 where the delta frame is de-duplicated to remove redundant data from within the delta frame itself. Following step 196, processing is complete.

In various embodiments, the system described herein may be used in connection with performance data collection for data migration and/or data mirroring techniques using a SAN. Data transfer among storage arrays, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

Although the system described herein has been discussed in connection with providing telemetry data for a SAN, it should be understood that the system may be applied to a single storage array, any group of storage arrays (not necessarily part of a SAN or of the same SAN). It is also noted that one or more storage arrays having components as described herein may, alone or in combination with other devices, provide an appropriate platform that executes any of the steps described herein. The system may operate with any snapshot mechanism not inconsistent therewith and further with any appropriate point-in-time image mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of reducing telemetry data transmitted from a storage system, comprising:
    selecting a data reduction algorithm from a plurality of data reduction algorithms, wherein selection includes eliminating data reduction algorithms that process frames of telemetry data at a lower rate than the frames of telemetry data are generated;
    applying the data reduction algorithm to the telemetry data;
    determining if the data reduction algorithm sufficiently reduces an amount of data that is transmitted using a communications channel; and
    removing some of the telemetry data in response to the data reduction algorithm not sufficiently reducing the amount of data that is transmitted.

2. A method, according to claim 1, wherein selecting a data reduction algorithm includes selecting a remaining one of the data reduction algorithms that provides a greatest amount of data reduction.

3. A method, according to claim 1, wherein the data reduction algorithms include data de-duplication and data compression.

4. A method, according to claim 1, wherein selecting a data reduction algorithm includes matching current telemetry data with historical telemetry data.

5. A method, according to claim 4, wherein a particular table of data reduction algorithms is selected based on the historical telemetry data.

6. A method, according to claim 5, wherein the table includes a plurality of entries, each corresponding to a specific data reduction algorithm.

7. A method, according to claim 6, wherein each of the entries includes values for a first field indicating an amount of time it takes to run a corresponding data reduction algorithm and an amount of data reduction provided by the corresponding data reduction algorithm.

8. A non-transitory computer-readable medium containing software that reduces telemetry data transmitted from a storage system, the software comprising:
   executable code that selects a data reduction algorithm from a plurality of data reduction algorithms, wherein selection includes eliminating data reduction algorithms that process frames of telemetry data at a lower rate than the frames of telemetry data are generated;
   executable code that applies the data reduction algorithm to the telemetry data;
   executable code that determines if the data reduction algorithm sufficiently reduces an amount of data that is transmitted using a communications channel; and
   executable code that removes some of the telemetry data in response to the data reduction algorithm not sufficiently reducing the amount of data that is transmitted.

9. A non-transitory computer-readable medium, according to claim 8, wherein executable code that selects a data reduction algorithm selects a remaining one of the data reduction algorithms that provides a greatest amount of data reduction.

10. A non-transitory computer-readable medium, according to claim 8, wherein the data reduction algorithms include data de-duplication and data compression.

11. A non-transitory computer-readable medium, according to claim 8, wherein executable code that selects a data reduction algorithm matches current telemetry data with historical telemetry data.

12. A non-transitory computer-readable medium, according to claim 11, wherein a particular table of data reduction algorithms is selected based on the historical telemetry data.

13. A non-transitory computer-readable medium, according to claim 12, wherein the table includes a plurality of entries, each corresponding to a specific data reduction algorithm.

14. A non-transitory computer-readable medium, according to claim 13, wherein each of the entries includes values for a first field indicating an amount of time it takes to run a corresponding data reduction algorithm and an amount of data reduction provided by the corresponding data reduction algorithm.

* * * * *